Dec. 25, 1951     C. H. WILLIAMS     2,579,773
SHEARS
Filed April 22, 1949
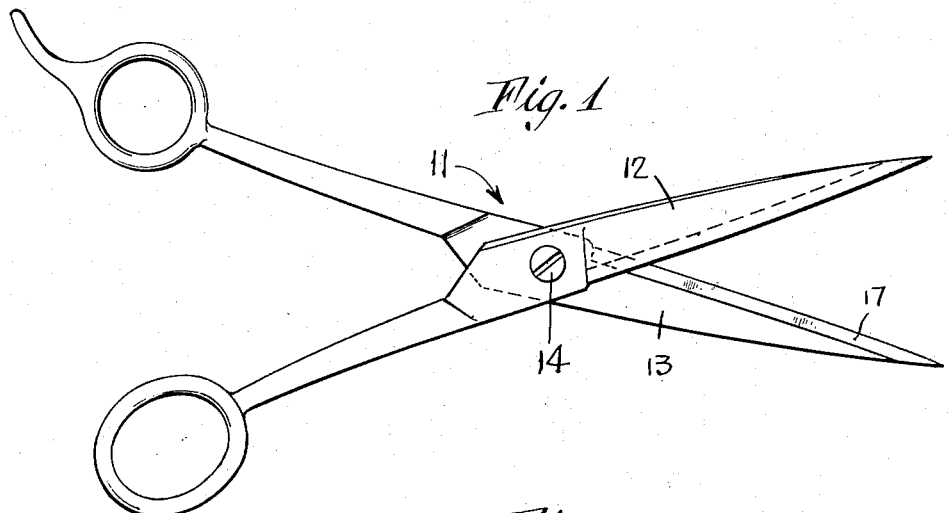
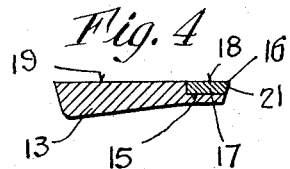
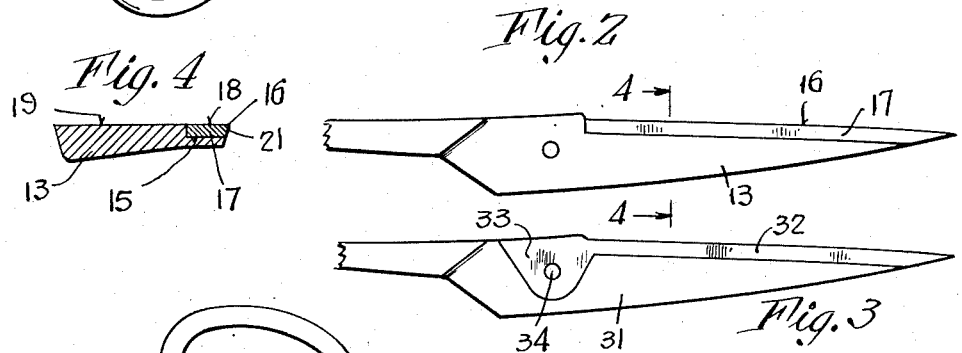
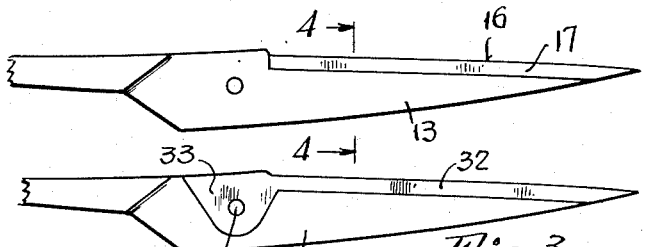
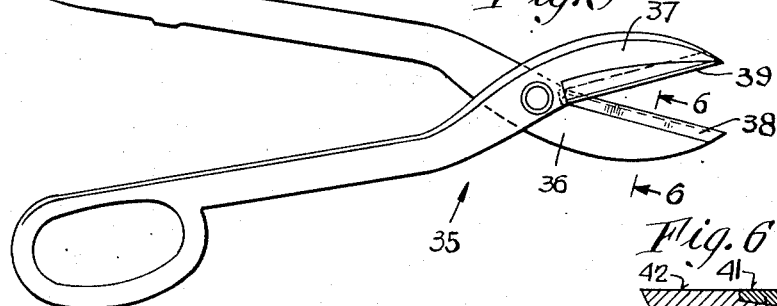
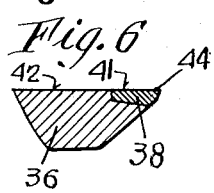
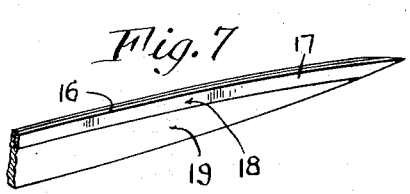
Inventor
Charles H. Williams
By Johnson and Kline
Attorneys

Patented Dec. 25, 1951

2,579,773

UNITED STATES PATENT OFFICE 2,579,773

SHEARS

Charles H. Williams, Bridgeport, Conn., assignor of thirty-nine one-hundredths to Louis W. Randall and ten one-hundredths to Ingolf C. Tengesdahl, both of Bridgeport, Conn.

Application April 22, 1949, Serial No. 89,106

1 Claim. (Cl. 30—350)

This invention relates to shears and is particularly intended for use in connection with barber's shears, although it will be apparent from the following description that it is equally well adapted to all types of shears, scissors and the like used for substantially any purpose.

Heretofore, the blades of barber's shears, for example, have usually been formed of tool steel, or the like, which requires hardening by heating and quenching. As a result, the entire body of the blade is brittle and easily damaged. Also, the varying effect of the hardening treatment frequently destroys or distorts the bowed shape of the shear blade which is requisite to proper cutting. This requires "setting" the blade in order to restore the proper bow to it. The setting operation consists of hammering or tapping a distorted shear blade by hand to provide or restore the correct bow, and in some places men are employed who give their entire time to this operation. At the same time, many shear blades are so distorted by the hardening operation that they cannot be properly set and must be thrown away. Also, shears in frequent use such, for example, as barber's shears, require frequent regrinding to maintain satisfactory cutting edges, usually at least every month and frequently more often, depending on their use. After a relatively few regrindings the shears are worn out and must be discarded. Because of these conditions a barber, for example, now requires numerous pairs of shears in order to constantly have a few sharp pairs in use.

An object of this invention is to provide an improved construction of shears which will overcome the above and other disadvantages.

A further object is to provide shears having cutting edges capable of prolonged use for an indefinite period of time without requiring setting, resetting, regrinding or any other maintenance operation. As a result, a barber, for example, will require only a pair or two in order to be assured of always having sharp shears available, in place of the relatively large number now necessary. At the same time, by eliminating the need of regrinding the present invention provides shears having an indefinitely prolonged life, while the elimination of any setting operation at any time reduces the cost and time of manufacture and maintenance.

A feature of this invention is the provision of a shear blade having a tough unhardened body portion joined to a preformed cutting portion of such character as to provide a cutting edge capable of long continued use without need of regrinding, resetting or other repair or maintenance operation.

A further feature is the provision of a shear blade in which not only the cutting edge, but the bearing for the hinge pivot is also formed to withstand long continued use without appreciable wear, thus maintaining over a long period the accuracy and efficiency of the cutting operation.

A further feature of the invention is the separate preforming of the body portion and of the cutting portion of a shear blade, so that when brought together it is only necessary to join the preformed parts to produce a finished blade having exactly the correct bow together with the other characteristics and qualities desired.

In general, the body portion of the blade is forged from steel or other suitable metal. In the forging operation it is given the requisite bow for proper cutting and is formed with a rabbeted edge extending from a point adjacent the pivot bearing to the end of the blade, and on a curve following that of the blade. A separate cutting portion is preformed with a similar curve to seat in the rabbeted edge and to have a preformed face, bowed on the same curvature as the body portion. A cutting edge extends along all or part of the cutting portion. The two portions are joined together by positioning the cutter portion in the rabbet of the body portion and joining the two together, preferably by silver soldering, using induction heating to avoid any hardening effect on the body proper, and to avoid distortion in any way altering the bowed construction of the two portions.

In the accompanying drawings:

Figure 1 is an elevation of a pair of barber's shears constructed in accordance with one embodiment of this invention.

Fig. 2 is a similar view of one of the shear blades shown in Fig. 1.

Fig. 3 is a similar view of a modified construction of shear blade illustrative of another embodiment of the invention.

Fig. 4 is a transverse sectional view on the line 4—4 of Fig. 2.

Fig. 5 is an elevation of a further modification showing the invention applied to a different type of shears.

Fig. 6 is a sectional view on the line 6—6 of Fig. 5.

Fig. 7 is a view showing on an exaggerated scale the bow of the blade.

The particular embodiment of the invention illustrated in Figs. 1, 2 and 4 is shown in connection with a pair of barber's shears 11 having blades 12 and 13 connected together by a conventional pivot 14 in the form of a threaded pin by means of which the pressure between the blades 12 and 13 can be adjusted to suit the individual taste of the user, and the requirements of the work being done. I prefer forming the body portion of each blade 12, 13 by forging a tough, unhardened steel blank to provide a body portion having the correct bow as shown in Fig. 7 and having a rabbeted edge 15 forged or milled in the face of the blade where the cutting edge is to be provided. As shown in the accompanying drawing, particularly in Fig. 7, the rabbet follows a curve which corresponds to that of the blade.

In the present invention, the cutting edge 16 of the shear blade is provided by a preformed tungsten carbide insert 17, the face 18 of which is ground to have the same curvature as the shearing face 19 of the body portion. Likewise, the outer face 21 of the carbide insert is ground to the proper angle to form the desired cutting edge 16. The insert is joined to the surfaces of the rabbet 15 with the face 18 thereof forming a continuation of the bowed surface 19 on the body portion and the outer edge 21 forming the edge surface of the completed blade.

I prefer to join the carbide insert to the rabbeted edge by a silver soldering operation in which high frequency induction heating is employed to produce the desired soldering effect. This prevents the operation from having any hardening effect on the body portion or causing any distortion of the bowed shape.

In the shears illustrated in Figs. 1, 2 and 4, for example, the rabbet is of such dimension as to accommodate an insert having a thickness of about .040 to .045 of an inch, while the thickness of the shear blade backing 22 is approximately .020 of an inch giving an over-all thickness of about .065. These dimensions, of course, are merely examples of a construction which has proved entirely satisfactory.

In the embodiment illustrated in Fig. 3, a shear blade 31 of tough, unhardened steel, is rabbeted to receive a tungsten carbide insert 32 which is formed with an enlarged section 33 shaped to provide a bearing block for the pivot pin 14 which extends through the pin hole 34. Such a construction increases the resistance to wear on the part of the bearing surfaces between the hinged shear blades and maintains the accuracy and efficiency of the cutting operation.

In the embodiment illustrated in Fig. 5 a pair of tin shears 35, or the like, has blades 36, 37 rabbeted to receive tungsten carbide inserts 38, 39. As in the other embodiments, the carbide insert 38, for example, has a face 41 ground to conformity with the curved face 42 of the associated blade body 36 and an edge surface 43 ground to provide the desired cutting edge 44.

It will be apparent that each embodiment provides a shear blade having a tungsten carbide cutting edge which is, comparatively speaking, almost impervious to wear and which provides a pair of shears the cutting edges of which will maintain their original sharpness for prolonged periods of time under conditions of constant use. The body portion of the blade being forged of tough, unhardened metal can be correctly shaped to the exact degree of bowing required in the finished blade. The thin tungsten carbide insert is preformed in any manner, preferably by pressing on a curved form at red heat, to have a bowed face which exactly conforms to the bowed surface of the body portion and to the curvature of the rabbet in which it will be seated. As a result, when the insert is joined to the blade by silver soldering as described, or by any suitable operation, the finished blade is provided with the exact form desired and the insert is also of substantially constant thickness along its length as seen in Fig. 7. No hardening operation is required. No setting by hand or any similar operation is necessary in order to produce or to maintain the correct shape of the blade. The only finishing operation normally required will be a moderate grinding of the face 18 to bring it exactly flush with surface 19 of the blade, and a light trimming of the edge face 21 to give the final refinement to the cutting edge 16. One or two pairs of such shears will assure a barber, for example, of always having a sharp pair available without constant regrinding and resetting, and a given pair of shears will last in its original sharpened condition indefinitely.

The invention can be variously modified and adapted and portions of the improvements can be used without others.

I claim:

A composite shear blade comprising a body portion of tough unhardened forged steel having a face bowed to conform to the requisite curvature of a shear blade for proper cutting, said body portion having a pivot opening therethrough, a recess extending transversely into the body portion from one edge in the vicinity of said opening and surrounding the same and a narrow rabbet providing two angularly related surfaces extending longitudinally along said edge from the recess to the end of the body portion; and a thin precurved rigid tungsten carbide insert of substantially uniform thickness throughout its length having a bowed face corresponding to said curvature with an enlarged portion extending laterally of the edge and interlockingly seated in said recess and forming a bearing block for a pivot pin, two longitudinally extending faces fitting in and permanently joined to the surfaces formed by said rabbet, and an outer cutting edge formed extending from said bearing block to the end of the body portion, the portions of the insert received in the rabbet being not over one-half the width of said enlarged portion.

CHARLES H. WILLIAMS.

REFERENCES CITED

The following references are of record in the file of this patent:

UNITED STATES PATENTS

| Number | Name | Date |
|---|---|---|
| 743,658 | Polkowski | Nov. 11, 1903 |
| 784,069 | Polkowski | Mar. 7, 1905 |
| 1,620,226 | Parker | Mar. 8, 1927 |
| 1,814,959 | Parker | July 14, 1931 |
| 2,384,204 | St. Clair | Sept. 4, 1945 |

OTHER REFERENCES

American Machinist, "Carbide Tools Tipped by Induction Brazing," pages 106-107, October 14, 1943.

Machinery, "Cemented Carbides Used for Other Purposes than Cutting Tools," pages 150-156, August 1946.